United States Patent Office 2,706,404
Patented Apr. 19, 1955

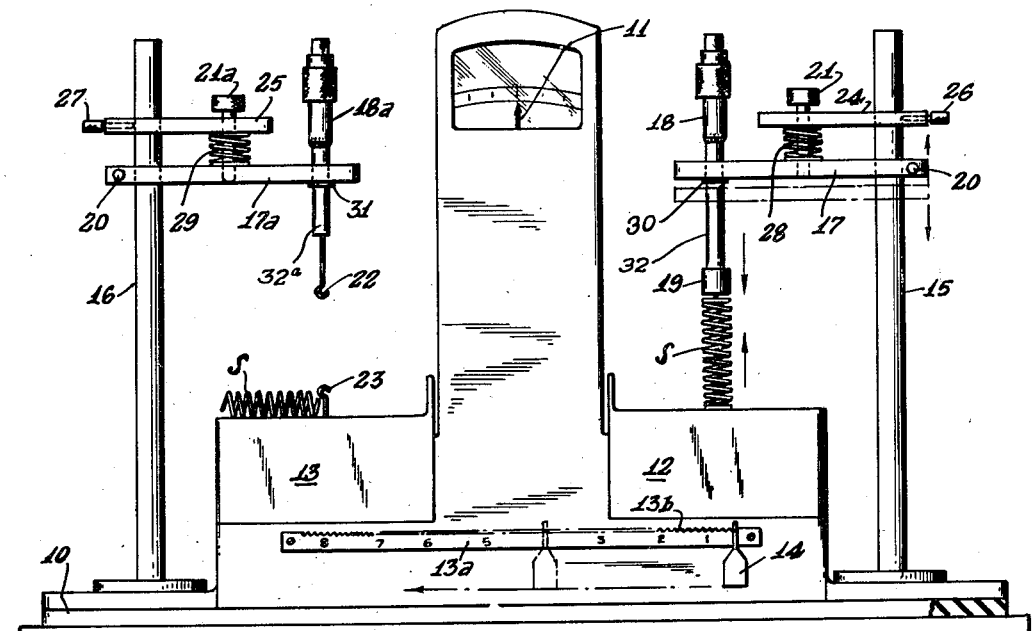
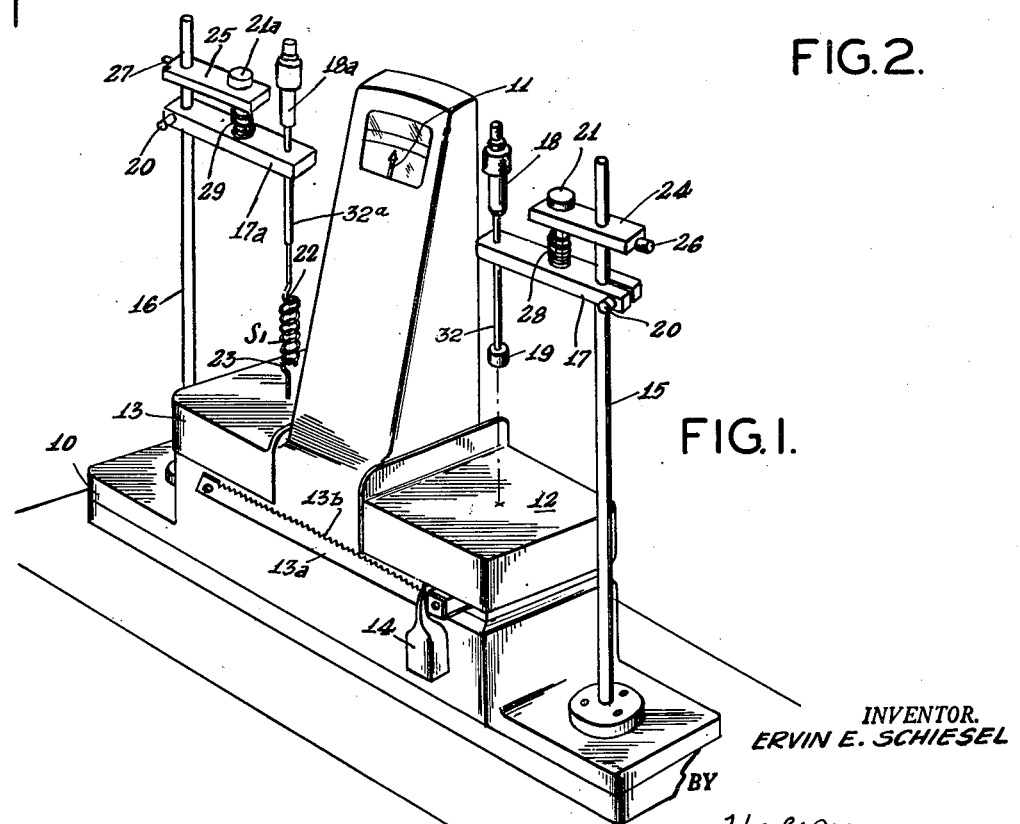
INVENTOR.
ERVIN E. SCHIESEL
BY
H. G. Manning
ATTORNEY.

2,706,404

SPRING TESTING APPARATUS

Ervin E. Schiesel, Meriden, Conn., assignor, by mesne assignments, to The Torrington Manufacturing Company, Torrington, Conn., a corporation of Connecticut Application September 28, 1951, Serial No. 248,784

5 Claims. (Cl. 73—93)

This invention relates to coil springs and more particularly to an apparatus for measuring the characteristics of coil springs under tensional and compressional forces.

One object of the present invention is to provide an apparatus of the above nature which is employed in connection with a standard balance scale having counterbalanced weighing tables and a movable poise.

A further object is to provide an apparatus of the above nature having a pair of balance standards fixed with respect to the balance scale, and a pair of adjustable micrometer verniers for accurately controlling the operation thereof.

A further object is to provide a device of the above nature which is capable of measuring the load or length of the coil spring, and also to check the tolerances thereof by statistical quality control in mass production.

A further object is to provide a device of the above nature which may be easily and rapidly calibrated by a set of gauge blocks or gauge washers for compression and tension springs respectively.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing:

Fig. 1 represents a perspective view of the spring testing apparatus showing a tension spring being tested on the left hand balance table.

Fig. 2 is a front view of the same showing a compression spring being tested on the right hand balance table.

Referring now to the drawing in which like reference numerals denote corresponding parts throughout the several views, the numeral 10 indicates the base of the spring testing apparatus, and the numeral 11 indicates the balance scale pointer for indicating the even balance position thereof.

Provision is made of a pair of weighing pans 12, 13 below which is a horizontal scale beam 13a having notches 13b in its upper edge for receiving a movable poise 14, as clearly shown in the drawing. At the sides of the pans 12, 13 provision is made of a pair of vertical standards 15, 16 rigidly secured upon the base 10.

Carried respectively by the standards 15 and 16 are two horizontal arms 17 and 17a which project respectively over the scale pans 12 and 13. Means is provided for connecting each arm with its standard for vertical adjustment relative thereto and for holding it in adjusted position. As shown, each arm is vertically slidable along its standard and a clamping screw 20 is provided for holding it in adjusted position. In Fig. 2 the arm 17 is shown in two different positions, one in full lines and one in dotted lines.

Carried respectively by the arms 17, 17a near the inner ends thereof are members 32 and 32a which are vertically movable relatively to the said arms. Connected with each of the said members is a means for vertically moving it and a means for indicating the extent of movement. As shown, the parts of a vernier micrometer constitute the two last said means. The micrometer for the member 32 is designated 18 and the micrometer for the member 32a is designated 18a. Each of the members 32 and 32a has a zero position with respect to its arm, and the corresponding micrometer serves to accurately indicate movements of the said member with respect to the arm and from its zero position. Tapped lock washers 30 and 31 are provided respectively for the members 32 and 32a, these washers tending to hold the said members in adjusted positions.

At the lower end of the member 32 is an abutment 19 for engaging the upper end of a compression spring to be tested, such as S, as shown in Fig. 2, the bottom end of the spring engaging the pan 12. At the lower end of the member 32a is a hook 22 for engaging the upper end of a tension spring to be tested, such as S', as shown in Fig. 1, the lower end of the spring engaging a hook 23 connected to the pan 13.

It is important that the abutment 19 for use in testing a compression spring be located above the pan 12 which tends to move upwardly as the poise 14 is moved from its zero position. It is equally important that the hooks 22 and 23 for use in a tension spring be located above the pan 13 which tends to move downwardly as the poise 14 is moved from its zero position.

Mounted respectively on the standards 15 and 16 and above the arms 17 and 17a are two horizontal arms 24 and 25. The said arms 24 and 25 are vertically adjustable along the standards 15 and 16, set screws 26 and 27 being provided for holding the said arms in vertically adjusted positions. The arms 17 and 24 are connected by a knurled headed screw surrounded by a coil spring 28, and the arms 17a and 25 are connected by a knurled headed screw 21a surrounded by a coil spring 29.

During spring testing, as hereinafter explained, it is necessary to accurately position the arms 17 and 17a. Taking the arm 17 as an example, the procedure is to release the arm 17 and also the arm 24 and to move both arms vertically in unison until the arm 17 is in approximately the required position. Then the arm 24 is locked in place by the screw 26, and the arm 17 is additionally moved to the exact position required by means of the screw 21. When the arm 17 is in the exactly proper position, it is clamped in the said position by the corresponding screw 20. A similar procedure is followed for positioning the arm 17a.

In operation, the right hand pan 12 will be used for testing compression springs, and the left hand pan 13 for testing tension springs.

Testing of short compression spring

For purposes of this description a "short" spring is one having a length less than the range of movement of the member 32 by the micrometer 18. As an example, a spring having a nominal length of .875" will be assumed to be such a spring, this spring being somewhat shorter than the spring S that is shown. It will be further assumed that the free length of the spring is to be accurately determined, and that the required loads are to be determined for compressing the spring to two predetermined lengths, as for instance a length of .750" and a length of .625". The testing procedure is as follows:

1. Set the micrometer 18 at its zero position.
2. Place a small weight on the left pan 13 so that the right pan 12 is biased upwardly and so that the pointer 11 is at the left of its central position.
3. Move the arm 17 downwardly until the abutment 19 engages the pan 12 and moves it sufficiently to cause the pointer 11 to move to its central position, the pan then being in its balanced position.
4. Remove the small weight from the left pan.
5. Move the member 32 and the abutment 19 upwardly with respect to the arm 17 to an extent sufficient to permit the placement of the spring to be tested between the abutment 19 and the pan 12.
6. Place the spring to be tested on the right pan 12 below the abutment 19, and place a similar spring on the left pan 13 so as to balance the weight of the spring on the pan 12.
7. Move the member 32 downwardly with respect to the arm 17 until it barely touches the top of the spring to be tested with the pointer 11 remaining in its central position. The resultant reading of the micrometer indicates the distance between the balanced position of the pan 12 and the abutment 19, this being the free length of the spring which may be slightly more or less than the nominal length of .875".

8. Move the member 32 additionally downwardly with respect to the arm 17 until the micrometer reading is exactly .750", this being a reduced distance between the balanced position of the pan 12 and the abutment 19 and being the first predetermined length to which the spring is to be compressed for testing.

9. Effect balancing by placing weights on the left pan 13 or by adjusting the poise 14 or by both until the pointer 11 is in its central position. This indicates that the pan 12 has been restored to its balanced position. The combined amount of the weights and of the poise reading represent the amount of load required to compress the spring to a length of .750".

10. Move the member 32 additionally downwardly with respect to the arm 17 until the micrometer reading is exactly .625", this being an additionally reduced distance between the balanced position of the pan 12 and the abutment 19 and being the second predetermined length to which the spring is to be compressed for testing.

11. Again effect balancing as defined in step 9 above, and obtain a new amount of load required to compress the spring to a length of .625".

When it is not necessary to accurately determine the free length of the spring, the above step 7 may be omitted.

When a number of similar springs are to be successively tested, the member 32 is left in the position set forth in step 8 or step 10 above, and the amount of the required load is determined as in step 9 or step 11 above. The load variations between similar springs are very small and these can be measured by moving the poise 14 without changing the weights on the pan 13. Ordinarily the pan 12 is movable downwardly sufficiently to permit successive springs to be inserted without moving the member 32 and the abutment 19.

*Testing of long compression spring*

For the purposes of this description a "long" spring is one having a length greater than the range of movement by the micrometer 18ᵃ. As an example, a spring S having a nominal length of 1.250" will be assumed to be such a spring. It will be further assumed that the free length of the spring is to be accurately determined and that the required loads are to be determined for compressing the spring to two predetermined lengths, as for instance a length of 1.000" and a length of .750". The testing procedure is similar to that for a short spring and is as follows:

12. Same as step 1 above.
13. Same as step 2 above.
14. Place a setup block on the pan 12 below the abutment 19, this block having a known height which may be assumed to be .500".
15. Move the arm 17 downwardly until the abutment 19 engages the block and moves the pan sufficiently to cause the pointer 11 to move to its central position, the pan 12 then being in its balanced position.
16. Same as step 4 above.
17. Remove the block that was placed as stated in step 14 above.
18. Same as step 5 above.
19. Same as step 6 above.
20. Move the member 32 downwardly as in step 7 above. The reading of the micrometer when added to the height of the block indicates the distance between the balanced position of the pan 12 and the abutment 19, this being the free length of the spring which may be slightly more or less than the nominal length of 1.250".
21. Move the member 32 additionally downwardly with respect to the arm 17 until the micrometer reading is exactly .500". This reading when added to the block height of .500 indicates a reduced total distance of 1.000" between the balanced position of the pan 12 and the abutment 19, this being the first predetermined length to which the spring S is to be compressed for testing.
22. Same as step 9 above, except for the difference in spring length.
23. Same as step 10 above, except that the micrometer reading will be .250", which reading when added to the block height of .500" will give a total distance of .750".
24. Same as step 11 above, except for the difference in spring length.

The general comments above as to the testing of a "short" spring are also applicable to the testing of a long spring.

*Testing of tension spring*

In referring to a tension spring such as S', the length will be understood to be the distance between the inner faces of the loops at the ends of the spring. For purposes of explanation it will be assumed that the spring has a free length of 3". The testing procedure is as follows:

25. Set the micrometer 18ᵃ at its zero position.
26. Move the arm 17ᵃ vertically to establish a predetermined initial distance between the spring engaging portions of the hooks 22 and 23 with the hook 23 in the position corresponding to the balanced position of the pan 13. The said distance may be less than the free length, as for instance 2.500". For convenience, a gage may be provided for more readily determining the said distance.
27. Place the spring S' in position for engagement of the loops thereof with the hooks 22 and 23.
28. Move the member 32ᵃ upwardly with respect to the arm 17ᵃ until the micrometer reading is .750", this reading indicating a total distance of 3.250" between the spring engaging portions of the hooks 22 and 23 with the hook 23 in the position corresponding to the balanced position of the pan 13. The said predetermined distance and the micrometer reading are added to determine the said total distance.
29. Effect balancing by placing weights on the pan 13 or by adjusting the poise 14 or by both until the pointer 11 is in its central position. This indicates that the hook 23 has been restored to its position corresponding to the balanced position of the pan 13. The combined amount of the weights and of the poise reading represent the amount of the force required to extend the spring S' to the length of 3.250".

When a number of similar springs are to be successively tested, the member 32ᵃ is left in the position set forth in step 28 above, and the amount of the required load is determined as in step 29 above. The load variations between similar springs are very small and these can be measured by moving the poise 14 without changing the weights on the pan 13. Ordinarily the pan 13 is movable upwardly sufficiently to permit successive springs to be engaged with the hooks 22 and 23 without moving the member 32ᵃ and the hook 22.

It will be understood that instead of using a vernier micrometer (as herein illustrated), a dial indicator may be employed to show the spring length under tension or compression, within the spirit and scope of this invention. The use of such a dial indicator will facilitate testing of the springs in mass production.

One advantage of the present invention is that it may be used to control production in the process of manufacture of coil springs by testing said springs after they have been first coiled, after heat treatment, or subsequently after plating.

While there has been disclosed in this specification one form in which the invention may be embodied, it is to be understood that this form is shown for the purpose of illustration only and that the invention is not to be limited to the specific disclosure but may be modified and embodied in various other forms without departing from its spirit. In short the invention includes all the modifications and embodiments coming within the scope of the following claims.

Having thus fully described the invention, what is claimed as new, and for which it is desired to secure Letters Patent, is:

1. In an apparatus for testing coil springs, the combination of a balance scale having a base and having a pair of similar weighing pans carried by the said base and having a scale beam with a balancing poise movable therealong from and to a zero position and having a movable pointer for indicating balanced positions of the said pans, one of the said pans having a spring engaging portion, an upright standard secured to the scale base in a fixed position adjacent the last said pan, an arm carried by the standard and projecting over the last said pan, a member carried by the arm and having a spring engaging portion above the spring engaging portion of the last said pan, means for effecting movement of the said member vertically with respect to the arm and to and from a zero position, means for connecting the arm with the standard for vertical adjustment relatively thereto and for holding it in adjusted position, the last said means enabling the said arm and the said member to be vertically moved in unison and with the latter in its said zero position so that the spring engaging portion of the member may be located in a predetermined relationship to the spring engaging portion of the last said pan with the said pan in its balanced position as indicated by the pointer, and means for accurately indicating vertical movements of the said member with respect to the said arm from its said zero position so as to indicate the length of a spring having its upper end engaging the said spring engaging portion of the said member and having its lower end engaging the spring engaging portion of the last said pan with the said pan in its said balanced position.

2. In an apparatus for testing coil compression springs, the combination of a balance scale having a base and having a pair of similar weighing pans carried by the said base and having a scale beam with a balancing poise movable therealong from and to a zero position and having a movable pointer for indicating balanced positions of the said pans, an upright standard secured to the scale base in a fixed position adjacent one pan, an arm carried by the standard and projecting over the last said pan, a member carried by the arm and having a bottom abutment face above the said pan, means for effecting movement of the said member vertically with respect to the arm and to and from a zero position, means for connecting the arm with the standard for vertical adjustment relatively thereto and for holding it in adjusted position, the last said means enabling the said arm and the said member to be vertically moved in unison and with the latter in its said zero position so that the said abutment of the member may be located in a predetermined relationship to the balanced position of the last said pan as indicated by the pointer, and means for accurately indicating vertical movements of the said member with respect to the said arm from its said zero position so as to indicate the length of a compression spring having its upper end engaging the said abutment and having its lower end engaging the last said pan with the pan in its said balanced position.

3. An apparatus as set forth in claim 2, wherein the said standard and the parts carried thereby are mounted adjacent the scale pan which tends to move upwardly as the result of movement of the poise from its zero position.

4. In an apparatus for testing coil tension springs, the combination of a balance scale having a base and having a pair of similar weighing pans carried by the said base and having a scale beam with a balancing poise movable therealong from and to a zero position and having a movable pointer for indicating balanced positions of the said pans, a hook on one of the said pans, an upright standard secured to the scale base in a fixed position adjacent the last said pan, an arm carried by the standard and projecting over the last said pan, a member carried by the arm and having a hook at the bottom thereof and above the first said hook, means for effecting movement of the said member vertically with respect to the arm and to and from a zero position, means for connecting the arm with the standard for vertical adjustment relatively thereto and for holding it in adjusted position, the last said means enabling the said arm and the said member to be vertically moved in unison and with the latter in its said zero position so that the said hook on the member may be located in a predetermined relationship to the first said hook when the corresponding pan is in the balanced position as indicated by the pointer, and means for accurately indicating vertical movements of the said member with respect to the said arm from its said zero position so as to indicate the length of a tension spring having its upper loop engaging the said hook on the member and having its lower loop engaging the said hook on the said pan with the pan in its said balanced position.

5. An apparatus as set forth in claim 4, wherein the first said hook is on the scale pan which tends to move downwardly as the result of the movement of the poise from its zero position, and wherein the said standard and the parts carried thereby are mounted adjacent the last said pan.

References Cited in the file of this patent

UNITED STATES PATENTS

| | | |
|---|---|---|
| 1,908,412 | Domina | May 9, 1933 |
| 1,921,793 | Thelander | Aug. 8, 1933 |
| 2,170,197 | Gumprich | Aug. 22, 1939 |
| 2,407,591 | Walley, Jr. et al. | Sept 10, 1946 |
| 2,467,539 | Smith | Apr. 19, 1949 |
| 2,612,041 | Goodfriend | Sept. 30, 1952 |

OTHER REFERENCES

Elasticometer, Type RS2 Spring Tester in American Machinist, June 11, 1931, pp. 919–920.